(No Model.)
E. C. ATKINS.
BAND SAW.
No. 341,989. Patented May 18, 1886.
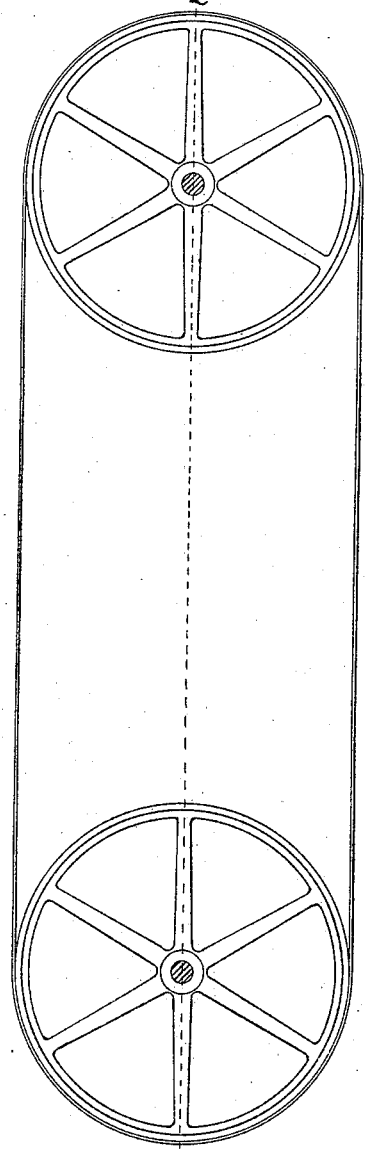
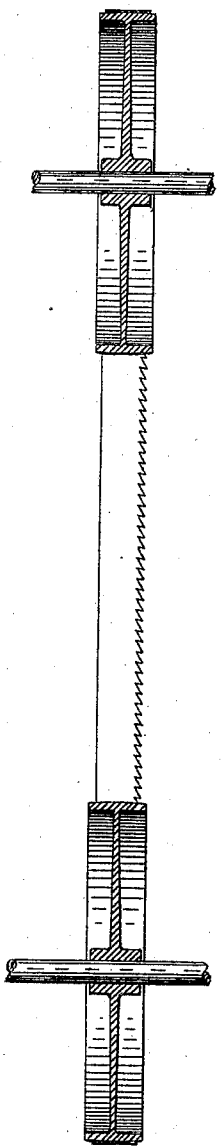
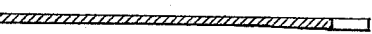
WITNESSES.
Chas N Leonard.
Charles L. Thurber.
INVENTOR.
Elias C. Atkins,
PER
C. Bradford.
ATTORNEY.

UNITED STATES PATENT OFFICE.

ELIAS C. ATKINS, OF INDIANAPOLIS, INDIANA.

BAND-SAW.

SPECIFICATION forming part of Letters Patent No. 341,989, dated May 18, 1886.

Application filed February 16, 1886. Serial No. 192,075. (No model.)

*To all whom it may concern:*

Be it known that I, ELIAS C. ATKINS, of the city of Indianapolis, county of Marion, and State of Indiana, have invented certain new and useful Improvements in Band-Saws, of which the following is a specification.

In order to prevent bands or belts from running from side to side, especially those which have a side pressure or tension at one edge more than at the other, it is necessary that the pulleys or wheels over which such bands run should be crowned or made somewhat convex upon the surface. This is especially true in band-saw mills, as the strain and pressure upon the toothed edge of a band-saw in operation is considerable. Such saws have, therefore, necessarily been so constructed that they would conform to this shape of wheel, and when so constructed saws will, in use, bow out somewhat in transverse section, and, as will readily be understood, have a tendency to "run," or diverge, in cutting, from a direct forward course. This tendency has heretofore been overcome by guides; but these, when made to do this work, produce an unnatural strain and friction upon the saw.

The object of my said invention is to produce a saw by which these disadvantages will be obviated; and it consists in making the plate convex, or formed thinner in the middle or central portion than upon the edges.

Referring to the accompanying drawings, which are made a part hereof, and on which similar letters of reference indicate similar parts, Figure 1 is a side elevation of pulleys carrying a band-saw formed in accordance with my invention; Fig. 2, a central vertical section of the same on the dotted line 2 2; Fig. 3, an enlarged transverse section of the saw, more clearly illustrating said invention; and Fig. 4, a similar view showing a slightly different but equivalent formation.

The saw, as is shown in the drawings, is sufficiently thinner in the center than at the edges to fit onto the convex surfaces of the wheels over which it runs without forcing the opposite side of the saw out beyond a straight line, and thus the saw, in cutting through the lumber, if properly prepared, will run straight without reference to the guides, and is thus relieved from the pressure and friction on such guides. Guides are not ordinarily dispensed with, however, as they are necessary for other purposes.

In order that the edges shall maintain their proper relative thickness as the saw is worn away, a portion of its width may be formed of equal thickness, as shown in Fig. 4, and thus the wear of the teeth occasioned by sharpening will not change the relation of the various portions of the width of the saw to each other. I do not desire, however, to be restricted in my invention to a saw formed in this manner, but desire to claim any band-saw formed thinner in the middle than upon the edges. The combination of the saw herein described with the wheels or pulleys for carrying and guiding it is made a feature of my application No. 192,867, filed February 23, 1886, and is therefore not claimed herein.

Having thus fully described my said invention, what I claim as new, and desire to secure by Letters Patent, is—

1. A band-saw thinner in the middle than at the edges.

2. A band-saw formed thin in the middle for a portion of its width, and having its edges formed of equal thickness for the remaining portion of its width, whereby as the saw is worn away the relative proportions of parts are maintained.

In witness whereof I have hereunto set my hand and seal, at Indianapolis, Indiana, this 13th day of February, A. D. 1886.

ELIAS C. ATKINS. [L. S.]

In presence of—
C. BRADFORD,
CHARLES L. THURBER.